pages)

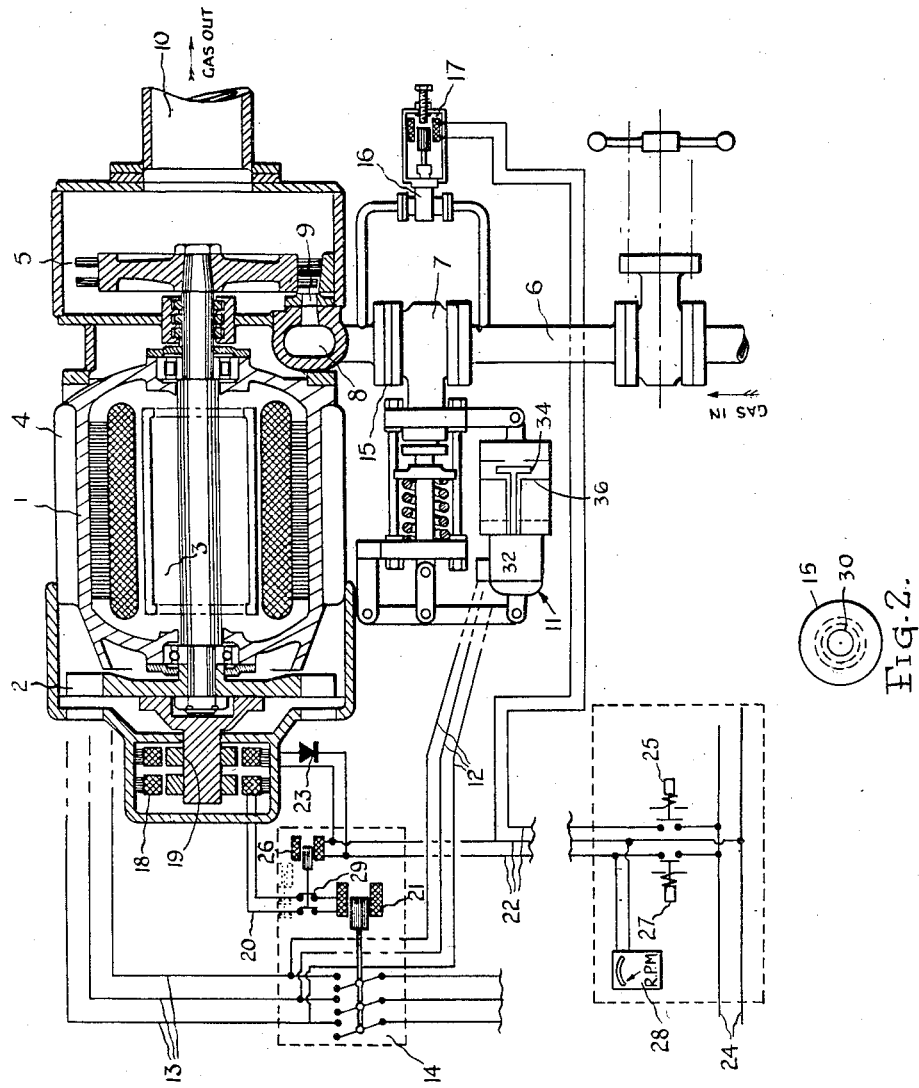

United States Patent Office 2,777,072
Patented Jan. 8, 1957

2,777,072

ELECTRIC GENERATING EQUIPMENT

William Scrymgeour Ross, Rugby, England, assignor to The British Thomson-Houston Company Limited, a British company Application April 26, 1955, Serial No. 503,952

Claims priority, application Great Britain April 26, 1954

4 Claims. (Cl. 290—40)

This invention relates to electric generating equipment consisting of a generator and a prime mover driving a generator, and has for its object to provide a simple and reliable apparatus which can be controlled from a remote location with a minimum of supervision.

An alternating current generating system according to the invention, comprises an asynchronous generator adapted to be driven by a prime mover, means for controlling the supply of working fluid to the prime moved for starting up the prime mover and bringing the generator up to its synchronous speed with relation to a load circuit line to which it is to be connected, and means for thereupon automatically connecting the generator to the line and increasing the supply of working fluid to the prime mover whereby to increase the speed of the generator and enable it to supply current to the line.

Preferably the asynchronous generator is in the form of a squirrel cage motor which, by virtue of its being driven above synchronous speed, operates as an induction generator. The generator is preferably a totally enclosed type of machine, so that it is capable of operation in situations where the atmosphere is otherwise detrimental to the operation of a generator.

The prime mover may be an elastic fluid turbine although other forms of prime mover may be employed if desired.

The control equipment may comprise a starting valve which passes sufficient working fluid to the prime mover to run the generator up to synchronous speed, the starting valve being operated by a relay controlled by a manually operable switch although direct manual operation of the starting valve may be resorted to if desired. The starting valve may, in the case in which the working fluid is directly supplied to a turbine, be in a conduit arranged in shunt to a main valve controlling the supply of working fluid to the prime mover under operating conditions.

Automatic opening of the main valve when the asynchronous generator has been driven up to approximately synchronous speed, is conveniently effected by providing an auxiliary generator on the shaft of the main generator, the auxiliary generator providing a source of supply for the control circuits of relays which, in turn, control the closing of the main circuit breaker, which in turn, initiates the opening of the main valve. Preferably it is desirable to provide for shutting down the main valve on over-speed. To this end, one or more auxiliary generators may be employed, consisting, or each consisting, of a permanent magnet machine producing an alternating voltage responsive to the speed of the generator. The control relay responsive to over-speed may be in the form of a relay operated when the alternating voltage of the auxiliary generator exceeds a value indicative of over-speed conditions.

The main valve is preferably controlled by means of an electro-hydraulic control device driven from the output of the main generator.

In order that the invention may be more readily understood, we will now describe the arrangement diagrammatically illustrated in Fig. 1 of the accompanying drawing which shows one embodiment of the invention and Fig. 2 which is a plan view of the restriction plate.

Referring to the drawing, we have indicated at 1 an asynchronous generator constructed in the form of the squirrel cage motor of the totally enclosed type being cooled by fans 2, mounted on the rotor 3 and passing cooling air over fins 4 on the casing of the machine. The generator is driven by a turbine having a rotor 5 mounted on the shaft. An extension of the shaft and the rotor 5 are overhung so as to provide simplicity in construction. Supply of working fluid to the turbine is obtained through a supply pipe 6 through a main control valve 7, the working fluid entering into an inlet chest 8 and passing through nozzles 9 through the blades of the rotor 5 and exhausting at 10.

The main control valve 7 is operated by means of an electro-hydraulic operating device 11 of the kind generally known under the term Thrustor which devices are disclosed, for example, in Patents 1,863,386, 1,866,334, 1,867,393, 1,901,620, 1,902,480, 1,993,613 and British Patents 363,137 and 380,774. The electro-hydraulic operating device 11 is provided with a motor 32, centrifugal impeller 34 and piston 36. The supply for the operating motor 32 of which is taken through lines 12 connected to the output lines 13 of the generator in front of the main circuit breaker 14. The supply pipe 6 may contain a restriction plate 15 best shown in Fig. 2 which plate has an aperture 30 designed to provide normally sufficient working fluid to the turbine to drive a generator under its normal conditions of load.

In order to run the equipment up to its normal synchronous speed a starting valve 16 is provided which is shown as arranged in shunt with the main valve 7, the starting valve, when open, supplying sufficient working fluid for the purpose in question. The starting valve is controlled by a relay 17.

In order to actuate the control circuits of the equipment, we provide on an extension of the casing of the generator 1 a pair of auxiliary generators 18, 19, preferably in the form of permanent magnet generators having stator windings mounted on laminar stators secured to the casing of the main generator.

Auxiliary generator 18 supplies current through a control circuit 20 to the operating coil 21 of the main circuit breaker 14 which connects the generator to the lines when the output from the auxiliary generator 18 indicates that the generator 1 is operating at synchronous speed.

Auxiliary generator 19 supplies current through the control circuit 22 to a relay 26 which will be operated when the output from the generator indicates that over-speed has been reached.

Rectifier 23 is located in the output circuit of auxiliary generator 19 to prevent generator 19 from forming a conductive path for current from supply 24.

This relay may also be operated from the remote control station by means of the push button 27, which then energises the relay from the supply 24.

In either case the effect produced by the operation of relay 26 is that the supply 20 to contactor coil 21 is interrupted. This disconnects the main generator from the line by opening the main circuit breaker. The generator, being of the induction type, ceases to generate as soon as it is disconnected from the line; thus, as soon as the power ceases to be available on lines 12, the electro-hydraulic actuating device 11 is de-energised and the main valve 7 closes under the influence of its spring loading. If desired the time required to close valve 7 may be reduced by furnishing the electro-hydraulic device 11 with a bypass valve in the manner described in United States Patent No. 2,036,798.

Reverting to the control circuit 22, the output of the generator 19 is used to actuate the electrical measuring instrument 28, which is located at the remote control position at the end of wires 22.

This instrument can be provided with a suitable scale in order to indicate the running speed of the generating plant and so provide a means of supervising its operation. Running speed provides an indication of the load being carried in the case of this type of generator.

It is intended that the equipment above described be operated from an existing source of supply of working fluid among which may be mentioned natural gas, and steams generated in a boiler heated by waste gases of an internal combustion engine or turbine. The operation of the equipment is rendered so automatic as to enable it to be remotely controlled, by unskilled labour if required, it being necessary only to operate the start and stop push button switches 25 and 27 respectively in order to start up or shut down the equipment.

What I claim as new and desire to secure by Letters Patent of the United States is:

1. An alternating current generating system comprising an asynchronous generator, a prime mover coupled to and driving said generator, valve means for controlling a supply of working fluid to said prime mover for starting up said prime mover and bringing said generator up to its synchronous speed, a load circuit, a circuit breaker for connecting said generator to said load circuit, means for automatically closing said circuit breaker and connecting said generator to said load circuit and means for thereupon automatically opening said valve means and increasing the supply of working fluid to said prime mover whereby to increase the speed of said generator and enable it to supply current to said load circuit.

2. An alternating current generating system comprising an asynchronous induction generator, a prime mover connected to said generator, main valve means for controlling the supply of working fluid to said prime mover, starting valve means by-passing said main valve means for supplying working fluid to said prime mover to start said prime mover into operation and bringing said prime mover up to and beyond synchronous speed, a circuit breaker, a load circuit, means responsive to the speed of said generator for automatically closing said circuit breaker to connect said generator to said load circuit when said generator has reached synchronous speed, electrohydraulic actuator means for opening said valve means, said actuator means being connected to be energised directly from the output of said generator whereby said actuator means is energised only when said circuit breaker is closed, and means for opening said circuit breaker and de-energising said electro-hydraulic actuator means whereby to close said main valve means and shut down said prime mover.

3. An alternating current generating system comprising an asynchronous induction generator, a prime mover connected to said generator, a permanent magnet generator connected to be driven by said induction generator, main valve means for controlling the supply of working fluid to said prime mover, starting valve means by-passing said main valve means for supplying working fluid to said prime mover for starting purposes, electro-magnetic means for opening said starting valve means and a starting switch for controlling the energisation of said electro-magnetic means, a circuit breaker, a load circuit, means energised by the output of said permanent magnet generator for automatically closing said circuit breaker to connect said induction generator to said load circuit when said induction generator has reached synchronous speed, electro-hydraulic actuator means for opening said main valve means, said actuator means being connected to be energised directly from the output of said induction generator whereby said actuator means is energised only when said circuit breaker is closed and means for opening said circuit breaker and thereby de-energising said electro-hydraulic actuator means whereby to close said main valve means and shut down said prime mover.

4. An alternating current generating system according to claim 3, having a second permanent magnet generator connected to be driven by said induction generator, electro-magnetic tripping relay means controlling the operating connection between said first permanent magnet generator and said circuit breaker whereby said tripping relay means is opened when the output of said second permanent magnet generator reaches a predetermined value, thereby causing said circuit breaker to open when the speed of said prime mover exceeds a safe value.

References Cited in the file of this patent

UNITED STATES PATENTS

| Re. 16,099 | Sprong | June 26, 1925 |
|---|---|---|
| 1,378,514 | Bergman | May 17, 1921 |
| 1,530,304 | Cox | Mar. 17, 1925 |
| 1,863,386 | Woods | June 14, 1932 |
| 1,866,334 | Woods | July 5, 1932 |
| 1,867,393 | Woods | July 12, 1932 |
| 1,901,620 | Woods | Mar. 14, 1933 |
| 1,902,480 | Woods | Mar. 21, 1933 |
| 1,993,613 | Lum | Mar. 5, 1935 |
| 2,036,798 | Driesch | Apr. 7, 1936 |
| 2,170,918 | Strong | Aug. 29, 1939 |
| 2,348,042 | Warren | May 2, 1944 |

FOREIGN PATENTS

| 363,137 | Great Britain | Dec. 17, 1931 |
|---|---|---|
| 380,774 | Great Britain | Sept. 22, 1932 |